United States Patent
Glover

(10) Patent No.: US 10,408,245 B2
(45) Date of Patent: Sep. 10, 2019

(54) SINGLE BOLT SHAFT CLAMP

(71) Applicant: KARSTEN MANUFACTURING CORPORATION, Phoenix, AZ (US)

(72) Inventor: Jim Glover, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 308 days.

(21) Appl. No.: 15/282,978

(22) Filed: Sep. 30, 2016

(65) Prior Publication Data

US 2017/0097023 A1    Apr. 6, 2017

Related U.S. Application Data

(60) Provisional application No. 62/236,770, filed on Oct. 2, 2015.

(51) Int. Cl.
*F16B 2/06*   (2006.01)
*F16B 2/08*   (2006.01)

(52) U.S. Cl.
CPC ............... *F16B 2/065* (2013.01); *F16B 2/08* (2013.01)

(58) Field of Classification Search
CPC .................................. F16B 2/065; F16B 2/08
See application file for complete search history.

(56) References Cited

U.S. PATENT DOCUMENTS

| | | |
|---|---|---|
| 1,099,137 A | 6/1914 | Williams |
| 3,214,813 A | 11/1965 | Goldman |
| 2013/0212842 A1 | 8/2013 | Rigollet et al. |

*Primary Examiner* — Ryan J. Walters

(57) ABSTRACT

Embodiments of the adjustable clamps having a curved body having an inner surface, an outer surface, a first side section, a second side section, a middle section, a recess, and a bore to receive a fastener to compress, or expand the adjustable clamps are presented herein. Other embodiments and related methods are also disclosed herein.

8 Claims, 10 Drawing Sheets

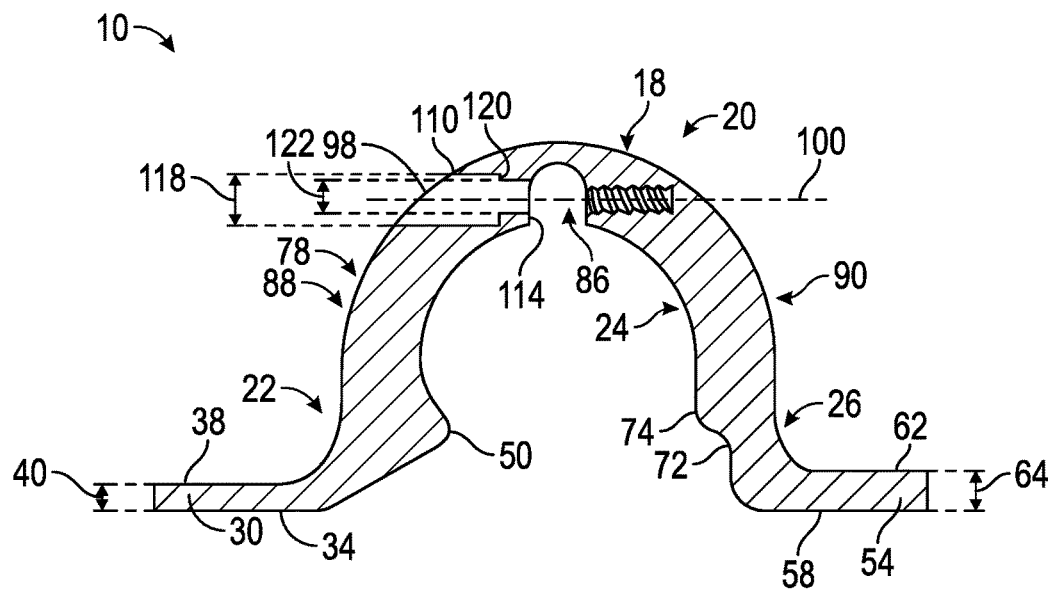

SINGLE BOLT SHAFT CLAMP

CROSS-REFERENCE TO RELATED APPLICATION

This claims the benefit of U.S. Provisional Application No. 62/236,770, filed on Oct. 2, 2015, the entire contents of which are fully incorporated herein by reference.

FIELD OF INVENTION

The present disclosure relates to clamps. In particular, the present disclosure is related to clamps that can attach to cylindrical objects.

BACKGROUND

Current designs of a shaft clamp are collar designs. The collar design does not allow for the clamp to be flush with a flat surface while the clamp is attached to a cylindrical object. This obstruction becomes inconvenient, takes up space, and limits the versatility of the clamp. Therefore, there is a need in the art for a clamp that can attach to a cylindrical object and be coplanar against a flat surface.

BRIEF DESCRIPTION OF THE DRAWINGS

FIG. 6 shows a cross-sectional front view of the adjustable clamp of FIG. 1.

FIG. 7 shows a top view of the adjustable clamp of FIG. 1.

Figure 1:
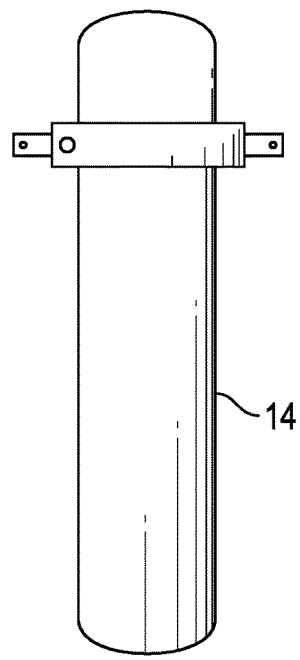
FIG. 1 shows a top view of an adjustable clamp coupled to a cylindrical object.

Other aspects of the disclosure will become apparent by consideration of the detailed description and accompanying drawings.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

DETAILED DESCRIPTION

The embodiments of the invention described below details adjustable clamps 10, 150 and 300 that can couple to any concentric structure without damaging the surface of the concentric structure due to the unique structure of the adjustable clamps 10. 150 and 300. The unique structure allows for the adjustable clamps 10, 150 and 300 to constrict and expand without deforming the general shape of adjustable clamps 10, 150 and 300. Further still, the adjustable clamps 10, 150 and 300 does not require to be attached onto a surface. As illustrated in FIGS. 1-3 and 10-12, the adjustable clamps 10 and 150 are attached to a cylindrical object 14 that can have many uses such as a hook, an attachment mount, a mounting bracket, creating shelving, a securing mechanism onto other devices or surface, as a divider, or any other uses.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," and "have," and any variations thereof, are intended to cover a non-exclusive inclusion, such that a process, method, system, article, device, or apparatus that comprises a list of elements is not necessarily limited to those elements, but may comprise other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

A) Adjustable Clamp with Two Flanges

Figure 2:
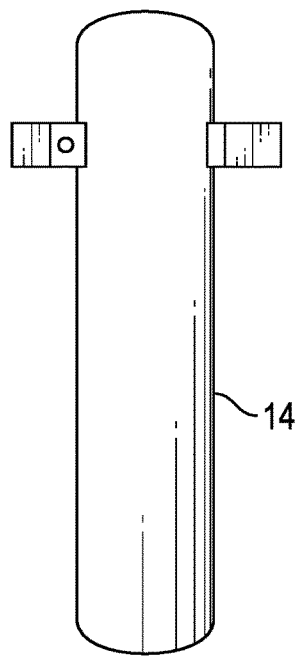
FIG. 2 shows a bottom view of the adjustable clamp of FIG. 1 coupled to the cylindrical object.
Figure 3:
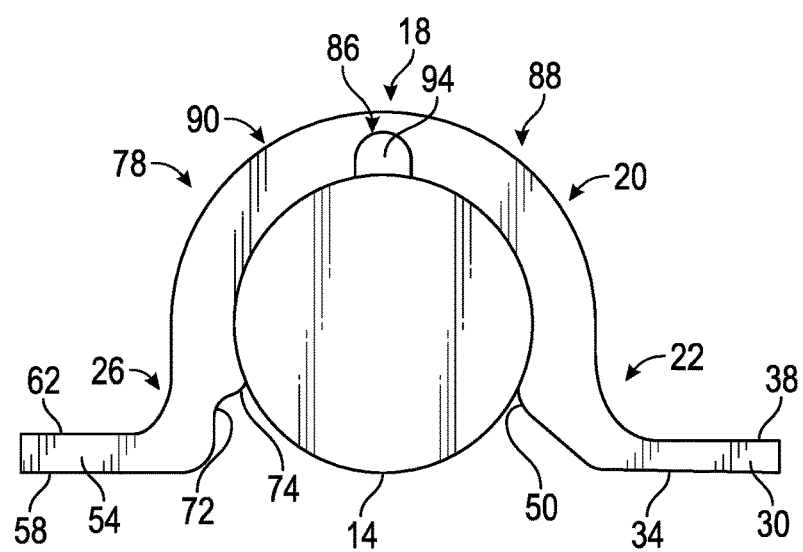
FIG. 3 shows a front view of the adjustable clamp of FIG. 1 coupled to the cylindrical object.

One embodiment of the invention is directed to an adjustable clamp 10 comprising a first flange 30, and a second flange 54. FIGS. 1-3 illustrate the adjustable clamp 10 removably coupled to a cylindrical object 14. The adjustable clamp 10 can be attached to a wide range of different sized cylindrical objects by adjusting a fastener, such as a screw, to constrict or expand the adjustable clamp 10. The adjustable clamp 10 can have multiple uses such as being a hook, being an attachment mount, being a mounting bracket, creating shelving, a securing mechanism onto other devices or surface (for example, securing a camera onto a tripod) and a divider. The adjustable clamp 10 comprises a middle section 18, a first side section 22, a second side section 26, an outer surface 20 and an inner surface 24.

I) First Side Section

Figure 4:
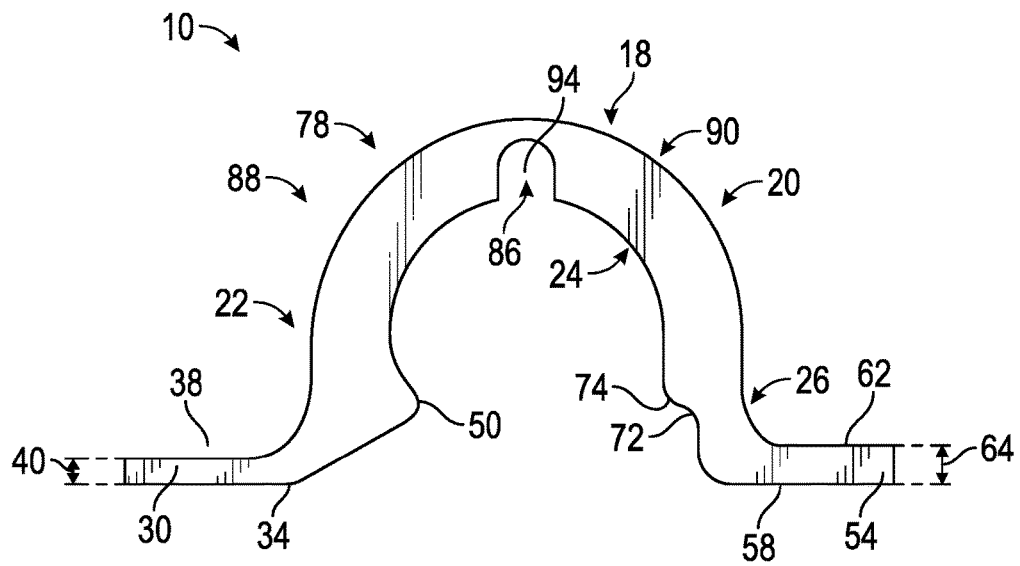
FIG. 4 shows another front view of the adjustable clamp of FIG. 1.
Figure 5:
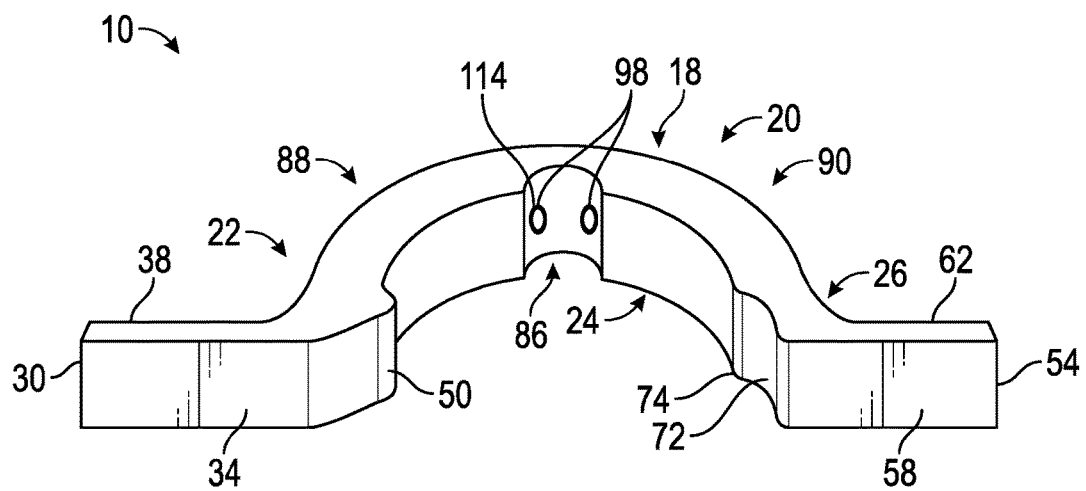
FIG. 5 shows a bottom perspective view of the adjustable clamp of FIG. 1.
Figure 10:
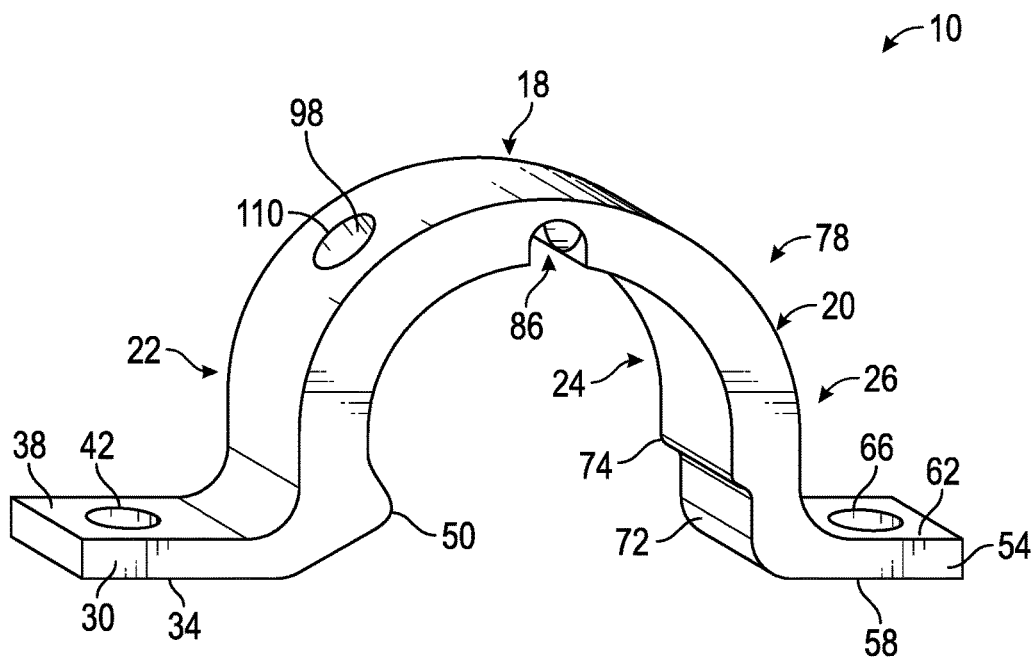
FIG. 10 shows a front perspective view of the adjustable clamp of FIG. 1.

As illustrated in FIGS. 4-6, the first side section 22 is integrally formed with the middle section 18 and the first flange 30. The first flange 30 comprises a bottom face 34. The bottom face 34 is a flat surface and is opposite the outer surface 20. A top face 38 is located on the outer surface 20 of the first flange 30, opposite the bottom face 34. The top face 38 is also a flat surface and is oriented parallel with the bottom face 34 of the first flange 30. The first flange 30 further comprises a thickness defined by a distance 40 between the bottom face 34 and the top face 38. The distance 40 of the first flange 30 can range between about 1 mm to 10 mm (e.g. 1 mm, 2 mm, 3 mm, 4 mm, 5 mm, 6 mm, 7 mm, 8 mm, 9 mm, or 10 mm). In some alternate constructions as illustrated in FIG. 10, the first flange 30 can further comprise a first aperture 42 for receiving a fastener to secure the adjustable clamp 10 to a surface.

A protrusion 50 at the point or intersection where the first flange 30 integrally forms with the first side section 22. The protrusion 50 is positioned between the bottom face 34 and the inner surface 24. Further, the protrusion 50 is a smooth rounded edge. The protrusion 50 provides a variation in thickness between the outer surface 20 and the inner surface 24. The smooth rounded edge of the protrusion 50 allows the adjustable clamp 10 to slide onto or snap onto the cylindrical object 14 without damaging the surface of the cylindrical object 14. The protrusion 50 also provides a pressure point on an object to secure the adjustable clamp 10.

II) Second Side Section

With reference to FIGS. 4-6, the second side section 26 of the adjustable clamp 10 is integrally formed with the middle section 18 and the second flange 54. The second flange 54 is positioned opposite the first side section 22. The second flange 54 comprises a bottom face 58. The bottom face 58 is flat and is opposite the outer surface 20. A top face 62 is located on the outer surface 20 of the second flange 54 and opposite the bottom face 58. The top face 62 is also flat and is oriented parallel with the bottom face 58 of the second flange 54. The bottom face 58 of the second flange 54 is coplanar with the bottom face 34 of the first flange 30. The second flange 54 further comprises a thickness defined by a distance 64 between the bottom face 58 and the top face 62. The distance 64 of the second flange 54 may range between about 3 mm to 15 mm (i.e. 3 mm, 4 mm, 5 mm, 6 mm, 7 mm, 8 mm, 9 mm, 10 mm, 11 mm, 12 mm, 13 mm, 14 mm, 15 mm). The distance 40 of the first flange 30 may be less than the distance 64 of the second flange 54. In some alternate constructions as illustrated in FIG. 10, the second flange 54 can further comprise a second aperture 66 for receiving a fastener to secure the adjustable clamp 10 to a surface.

Referring to FIGS. 3-6, a notch 72 is located at the point or intersection where the second side section 26 is integrally formed with the second flange 54. The notch 72 is positioned in-between the inner surface 24 and the bottom face 58 of the second flange 54. A protrusion 74 is formed in the inner surface 24 at an intersection formed by the second side section 26 and the second flange 54. The notch 72 is positioned adjacent to the protrusion 74 and is closer to the second flange 54 while the protrusion 74 is closer to the recess 86. The protrusion 74 has a smooth rounded edge and functionality similar to the protrusion 50 of the first side section 22 as referenced above. The protrusion 74 provides a variation in thickness between the outer surface 20 and the inner surface 24. The protrusion 74, and the notch 72 provides the adjustable clamp 10 more leverage when snapping onto the cylindrical object 14.

III) Middle Section

Referring to FIGS. 4-6, the middle section 18 or curved body is integrally formed with the first side section 22 and the second side section 26. The outer surface 20 of the middle section 18 comprises a boundary 78 that is substantially concentric with a portion of the inner surface 24 of the middle section 18. The middle section 18 comprises a recess 86 in the inner surface 24. The recess 86 is positioned at a generally central location of the middle section 18. The recess 86 generally divides the middle section 18 into a first portion 88 and a second portion 90. The recess 86 defines an axis 94. The axis 94 is perpendicular to the first flange 30 and the second flange 54.

The recess 86 further comprises an arcuate surface defining a radius of curvature. Both the location and the radius of curvature of the recess 86 allow for the first portion 88 and the second portion 90 to constrict or enlarge the contoured shape of the adjustable clamp 10 by compressing or expanding the recess 86 without deforming the contoured shape of the adjustable clamp 10. The constriction of the first portion 88 and the second portion 90 allow the adjustable clamp 10 to secure onto the cylindrical object 14. When the adjustable clamp 10 is being loosened, the first portion 88 and the second portion 90 expand the contoured shape of the adjustable clamp 10. The expansion of the first portion 88 and the second portion 90 allow for the adjustable clamp 10 to detach from the cylindrical object 14.

a) Bore

With continued reference to FIGS. 4-6, the middle section 18 further still comprises a bore 98. The bore 98 extends through the outer surface 20 of the first portion 88 of the adjustable clamp 10 and into the recess 86. The bore 98 continues through the recess 86 and into the second portion 90 of the middle section 18. The bore 98 comprises an axis 100 that is generally parallel with the first flange 30 and the second flange 54. The axis 100 is also generally perpendicular to the axis 94. The bore 98 further comprises a first end 110 and a second end 114. The first end 110 is located on the outer surface 20 of the first portion 88 of the adjustable clamp 10 and has a first diameter 118, as seen in FIG. 6. The bore 98 further still comprises a step 120 with a reduction in diameter and extends into the recess 86. The second end 114 has a second diameter 122. The second diameter 122 is smaller than the first diameter 118. As seen in FIGS. 5 and 6, the bore 98 continues through the recess 86 and into the second portion 90 of the adjustable clamp 10. The portion of the bore 98 in the second portion 90 comprises a third diameter 126. The third diameter 126 is less than both the first diameter 118 and the second diameter 122. The bore 98 in the second portion 90 has a threaded inner surface configured to receive a fastener 130. In other embodiments, the bore 98 may extend through the outer surface 20 of the second portion 90, into the recess 86 and continue through into the first portion 88 (not illustrated).

b) Fastener

Figure 8:
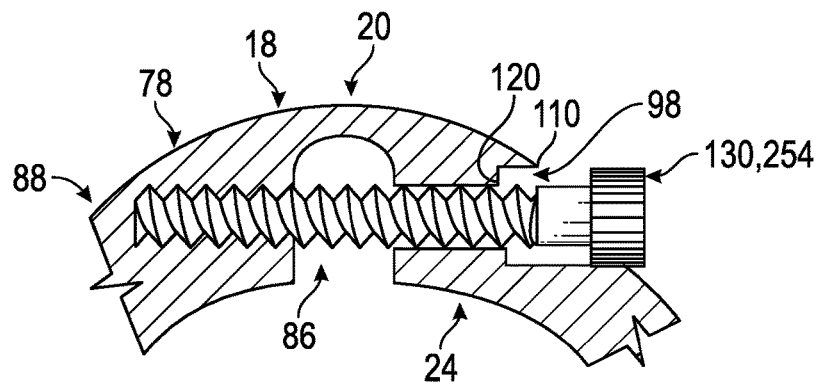
FIG. 8 shows a cross-sectional view of a fastener coupled into a bore of the adjustable clamp of FIG. 1.
Figure 9:
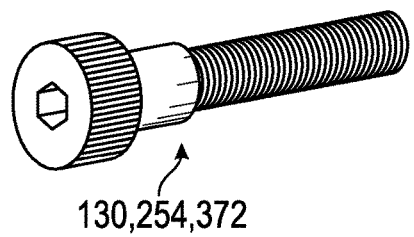
FIG. 9 shows another view of the fastener of FIG. 8.

As referenced above, the bore 98 is configured to receive the fastener 130, such as a machine screw, a sheet metal screw, a hex bolt, a lag bolt, a self-drilling screw, a flange bolt, an eye bolt, a carriage bolt, a socket screw, or the like. FIGS. 8 and 9 illustrate an example of one fastener 130. The fastener 130 can compress or expand the recess 86. As illustrated in FIG. 8, the fastener 130 has a threaded surface which mates with the threaded inner surface of the bore 98 in the second portion 90 of the adjustable clamp 10. When tightening the adjustable clamp 10, the threads of the fastener 130 engage the threaded inner surface of the bore 98 in the second portion 90 and compress the recess 86. When loosening the adjustable clamp 10, the threads of the fastener 130 disengage the threaded inner surface of the bore 98 and expand the recess 86.

B) Adjustable Clamp with One Flange

Figure 11:
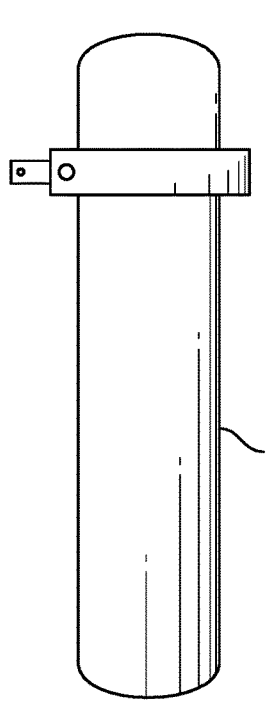
FIG. 11 shows a top view of another adjustable clamp coupled to a cylindrical object.
Figure 12:
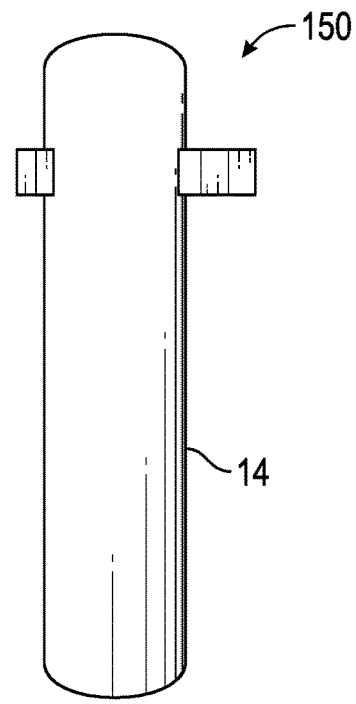
FIG. 12 shows a bottom view of the adjustable clamp of FIG. 11 coupled to the cylindrical object.
Figure 13:
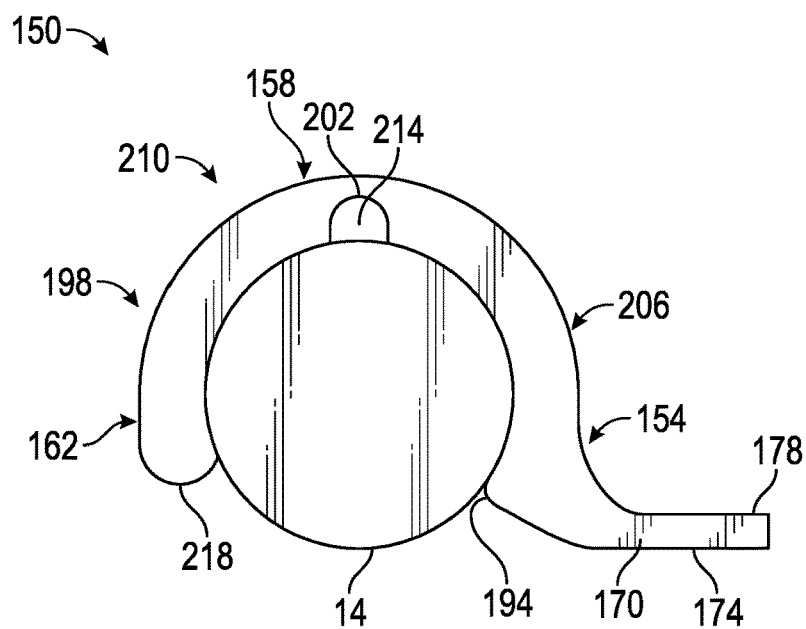
FIG. 13 shows a front view of the adjustable clamp of FIG. 11 coupled to the cylindrical object.

Another embodiment of the invention is directed to an adjustable clamp 150 having one flange 170 as illustrated in FIGS. 11-20. FIG. 11 illustrates the adjustable clamp 150 removably coupled to the cylindrical object 14. The adjustable clamp 150 can be attached to a wide array of different sized cylindrical objects by adjustment of a fastener 254, as well as create a coplanar surface when attached to cylindrical objects. Further, the adjustable clamp 150 can have multiple uses such as being a hook, being an attachment mount, being a mounting bracket, creating shelving, a securing mechanism onto other devices or surface (for example, securing a camera onto a tripod) or a divider. The adjustable clamp 150 comprises a first side section 154, a middle section 158, an outer surface 162 and an inner surface 166 as illustrated in FIGS. 14-17.

I) First Side Section

Figure 16:
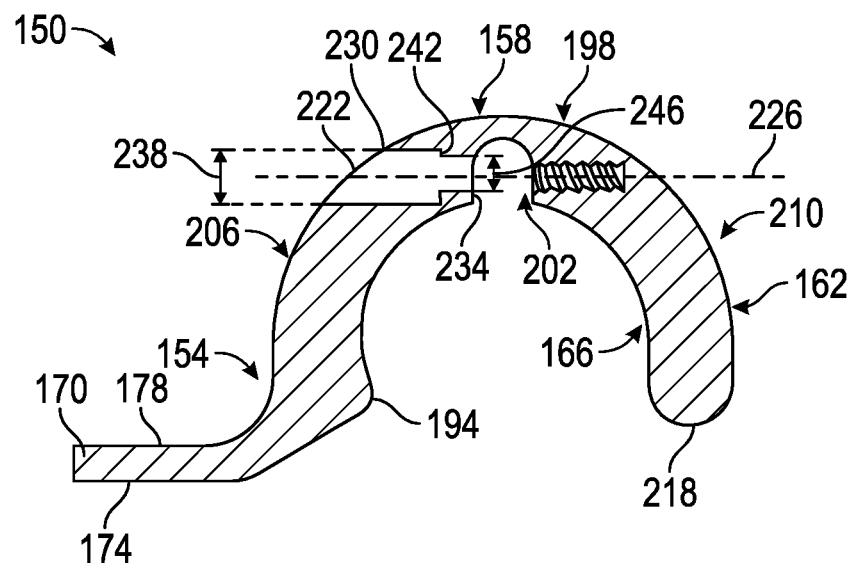
FIG. 16 shows a cross-sectional front view of the adjustable clamp of FIG. 11.
Figure 17:
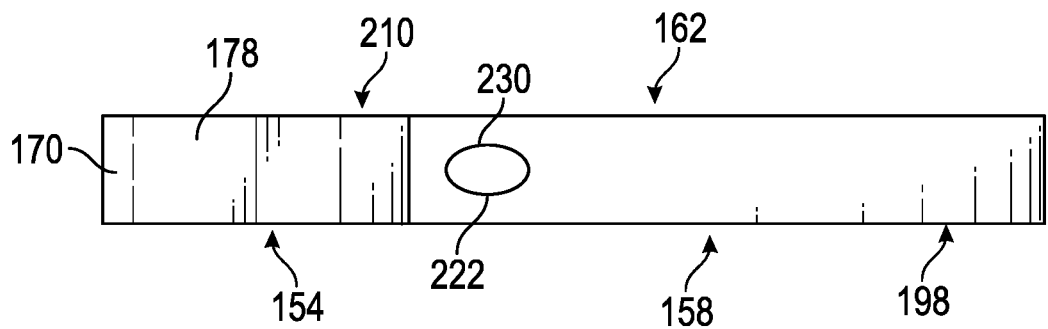
FIG. 17 shows a top view of the adjustable clamp of FIG. 11.
Figure 18:
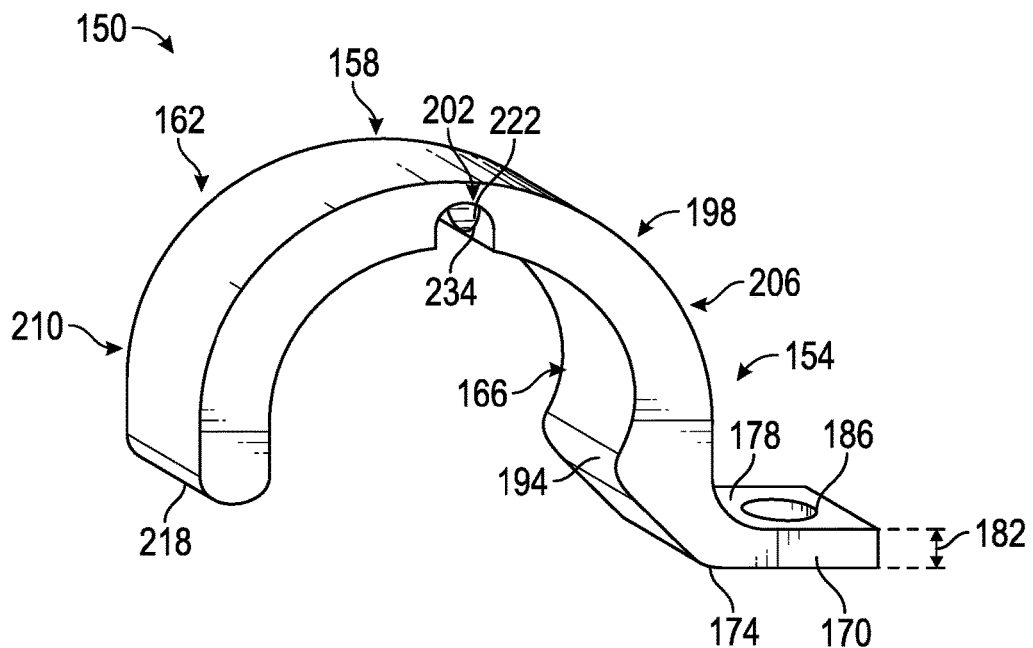
FIG. 18 shows a perspective view of the adjustable clamp of FIG. 11.
Figure 19:
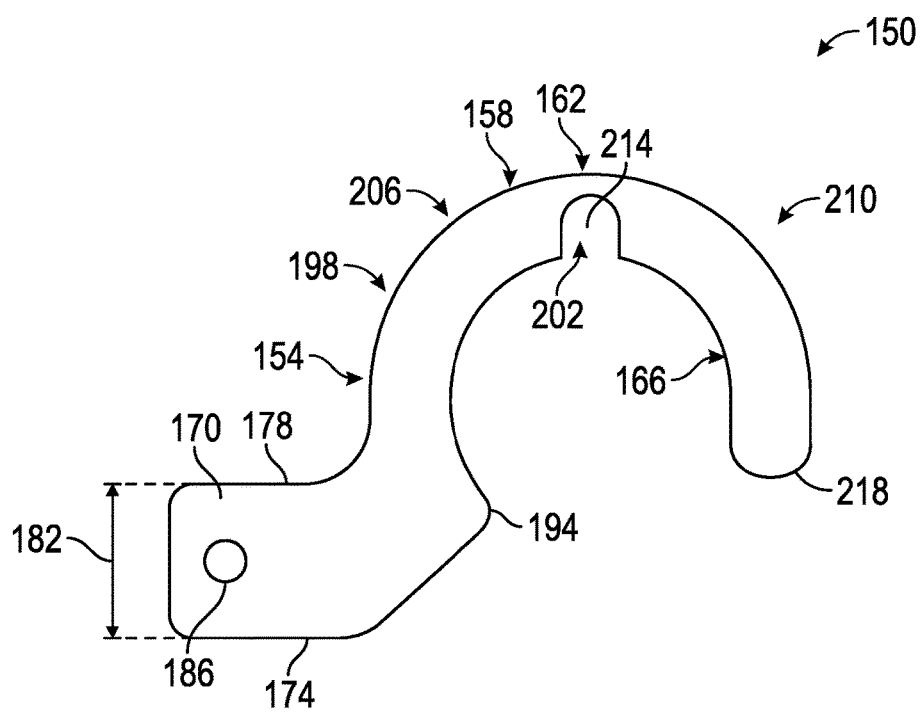
FIG. 19 shows an alternate configuration of the adjustable clamp of FIG. 11.
Figure 20:
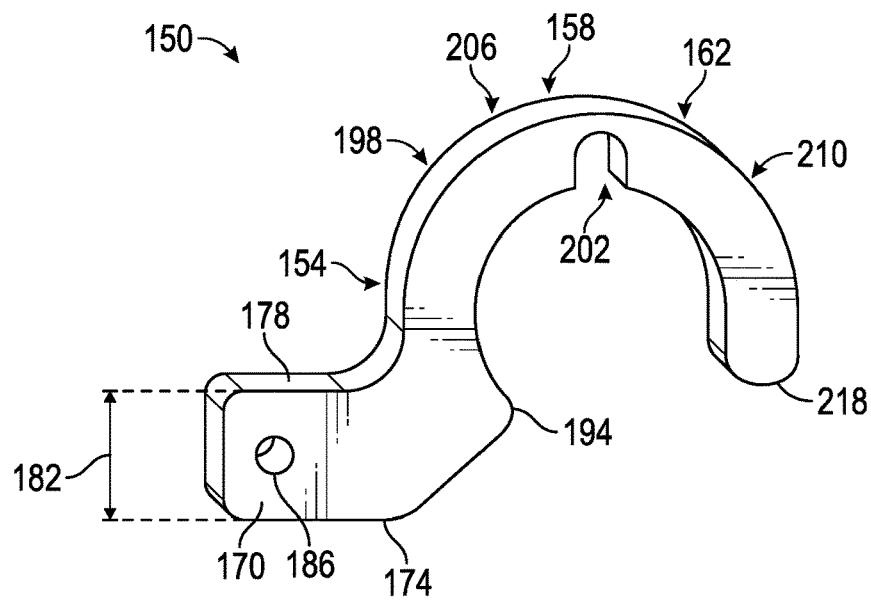
FIG. 20 shows a front perspective view of the adjustable clamp of FIG. 19.

Illustrated in FIGS. 14-20, the first side section 154 is integrally formed with the middle section 158 and the flange 170. The flange 170 comprises a bottom face 174. The bottom face 174 is a flat surface and is opposite the outer surface 162. A top face 178 is located on the outer surface 162 of the flange 170, opposite the bottom face 174. The top face 178 is also a flat surface and is oriented parallel with the bottom face 174 of the flange 170. The flange 170 further comprises a thickness defined by a distance 182 between the bottom face 174 and the top face 178. The distance 182 of the flange 170 can range between about 1 mm to 10 mm (e.g., 1 mm, 2 mm, 3 mm, 4 mm, 5 mm, 6 mm, 7 mm, 8 mm, 9 mm, or 10 mm) as illustrated in FIGS. 14-20. In an alternative constructions, the distance 182 of the flange 170 can range between about 10 mm to 20 mm, about 20 mm to 30 mm, about 30 mm to 40 mm, and about 40 mm to 50 mm (e.g., at least 10 mm at least 15 mm, at least 20 mm, at least 25 mm, at least 30 mm, at least 35 mm, at least 40 mm, at least 45 mm, or at least 50 mm). In one alternate construction, as illustrated in FIGS. 19 and 20, the flange 170 comprises a thickness having a distance 182 of about 40 mm to 50 mm. In some alternate constructions as illustrated in FIG. 18, the flange 170 can further comprise an aperture 186 positioned on the top face 178 for receiving a fastener to secure the adjustable clamp 10 to a surface. In an alternate construction, as referenced in FIGS. 19 and 20, the flange 170 may comprise the aperture 186 positioned on a front surface of the flange, perpendicular to the top face 178. The aperture 186 positioned on the front surface of the flange can receive the fastener 190 as well to secure the adjustable clamp 150 to a surface near an edge. For example, the surface for the adjustable clamp 150 can be secured to can be a table, or shelf, the end of a wall or any edge.

Figure 15:
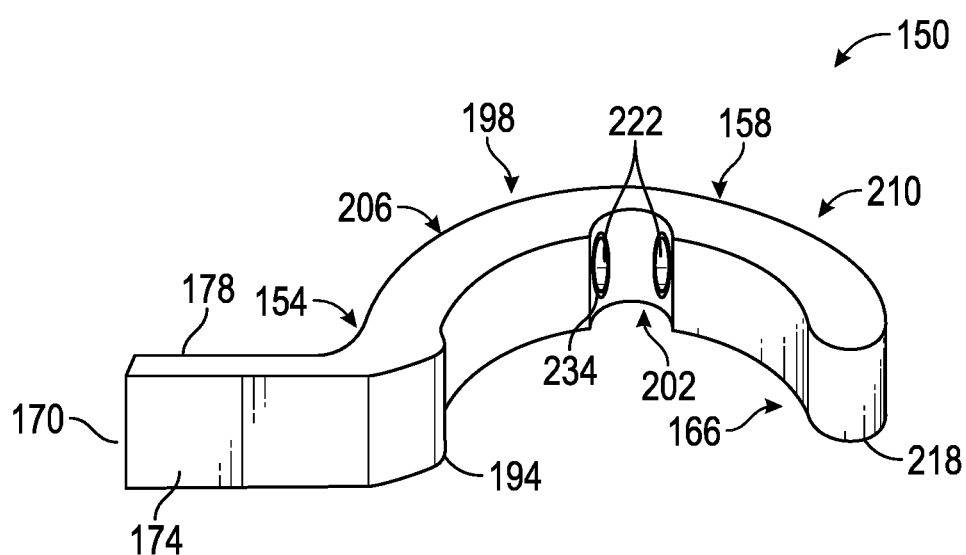
FIG. 15 shows a bottom perspective view of the adjustable clamp of FIG. 11.

Illustrated in FIGS. 15-17, the flange 170 is solid. In an alternative construction, as referenced in FIG. 18, the flange 170 may comprise an aperture 186 for receiving a fastener 190 to secure the adjustable clamp 150 to a surface. In other alternate constructions, as referenced in FIGS. 19 and 20, the flange 170 may comprise the aperture 186 positioned on a front surface of the flange, perpendicular to the top face 178. The aperture 186 positioned on the front surface of the flange can receive the fastener 190 as well to secure the adjustable clamp 150 to a surface near an edge. For example, the surface for the adjustable clamp 150 can be secured to a table, or shelf or the end of a wall.

A protrusion 194 is located at the point or intersection where the flange 170 integrally forms with the first side section 154. The protrusion 194 is positioned between the bottom face 174 of the flange 170 and the inner surface 166. Further, the protrusion 194 comprises a smooth rounded edge that allows the adjustable clamp 150 to slide onto or snap onto the cylindrical object 14 without damaging the surface of the cylindrical object 14.

II) Middle Section

Referring to FIGS. 14-20, the middle section 158 or curved body is integrally formed with the first side section 154. The outer surface 162 of the middle section 158 comprises a boundary 198 that is substantially concentric with a portion of the inner surface 166 of the middle section 158. The middle section 158 further comprises a recess 202 in the inner surface 166. The recess 202 generally divides the middle section 158 into a first portion 206 and a second portion 210. The recess 202 defines an axis 214. The axis 214 is perpendicular to the flange 170 of the first side section 154.

The recess 202 comprises an arcuate surface defining a radius of curvature. Both the location and the radius of curvature of the recess 202 allow for the first portion 206 and the second portion 210 to constrict or enlarge the contoured shape of the adjustable clamp 150 by compressing or expanding the recess 202 without deforming the contoured shape of the adjustable clamp 150. Constricting the first portion 206 and the second portion 210 allow the adjustable clamp 150 to secure onto the cylindrical object 14. When the adjustable clamp 150 is being loosened, the first portion 206 and the second portion 210 expand the contoured shape of the adjustable clamp 150. The expansion of the first portion 206 and second portion 210 allow for the adjustable clamp 150 to detach from the cylindrical object 14.

Figure 14:
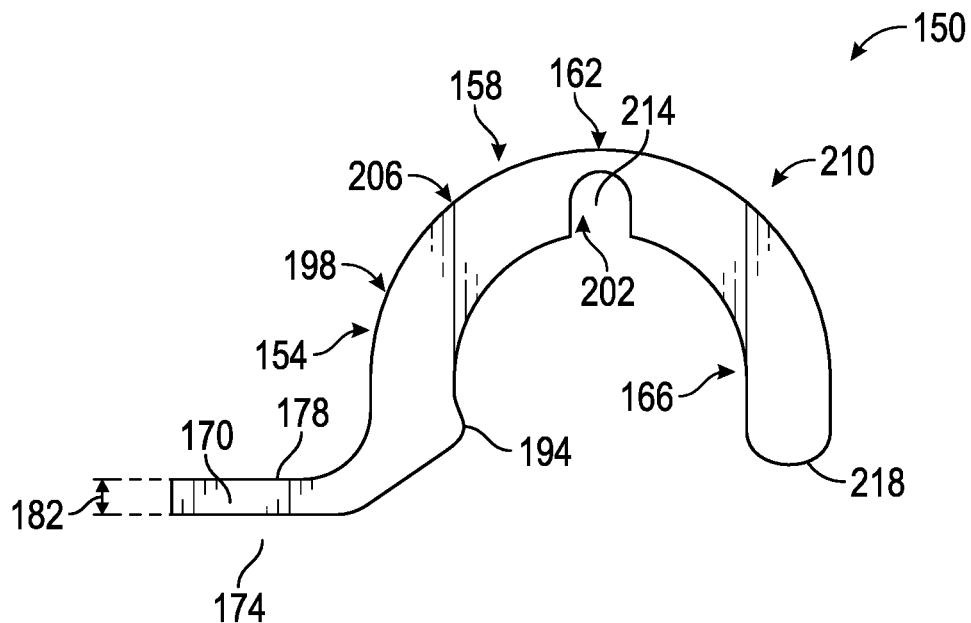
FIG. 14 shows another front view of the adjustable clamp of FIG. 11.

Referring to FIG. 14, the middle section further comprises a rounded end 218, opposite the first side section 154. The rounded edge 218 generally divides the outer surface 162 with the inner surface 166. Further the rounded end 218, and the smooth rounded edge of the protrusion 194 referenced above, allow for the adjustable clamp 150 to slide onto or snap onto the cylindrical object 14 without damaging the surface of the cylindrical object 14.

a) Bore

In FIGS. 14-17 and 20, the middle section further still comprises a bore 222. The bore 222 extends through the outer surface 162 of the first portion 206 of the middle section 158 and into the recess 202. The bore 222 continues through the recess 202 and into the second portion 210 of the middle section 158. The bore 222 comprises an axis 226 that is generally parallel with the flange 170. The axis 226 is also generally perpendicular to the axis 214. The bore 222 further comprises a first end 230 and a second end 234. The first end 230 is positioned on the outer surface 162 of the first portion 206 of the middle section 158 and has a first diameter 238, as seen in FIG. 16. The bore 222 further still comprises a step 242 with a reduction in diameter and extends into the recess 202. The second end 234 has a second diameter 246. The second diameter 246 is smaller than the first diameter 238. As seen in FIGS. 15 and 16, the bore 222 continues through the recess 202 and into the second portion 210 of the adjustable clamp 150. The portion of the bore 222 in the second portion 210 comprises a third diameter 250. The third diameter 250 is less than both the first diameter 238 and the second diameter 246. The bore 222 in the second portion 210 has a threaded inner surface configured to receive the fastener 254. In other embodiments, the bore 222 may extend through the outer surface 162 of the second portion 210, into the recess 202 and continue through the first portion 206 (not illustrated).

b) Fastener

As referenced above, the bore 222 is configured to receive the fastener 254, such as a machine screw, a sheet metal screw, a hex bolt, a lag bolt, a self-drilling screw, a flange bolt, an eye bolt, a carriage bolt, a socket screw, or the like. FIGS. 8 and 9 illustrate an example of one fastener 254. The fastener 254 can compress or expand the recess 202. As seen in FIG. 10, the fastener 254 has a threaded surface which mates with the threaded inner surface of the bore 222 in the second portion 210 of the adjustable clamp 150. When tightening the adjustable clamp 150, the threads of the fastener 254 engage the threaded inner surface of the bore 222 in the second portion 210 and compress the recess 202. When loosening the adjustable clamp 150, the threads of the fastener 254 disengage the threaded inner surface of the bore 222 and expand the recess 202.

C. Adjustable Clamp with Slit

Figure 21:
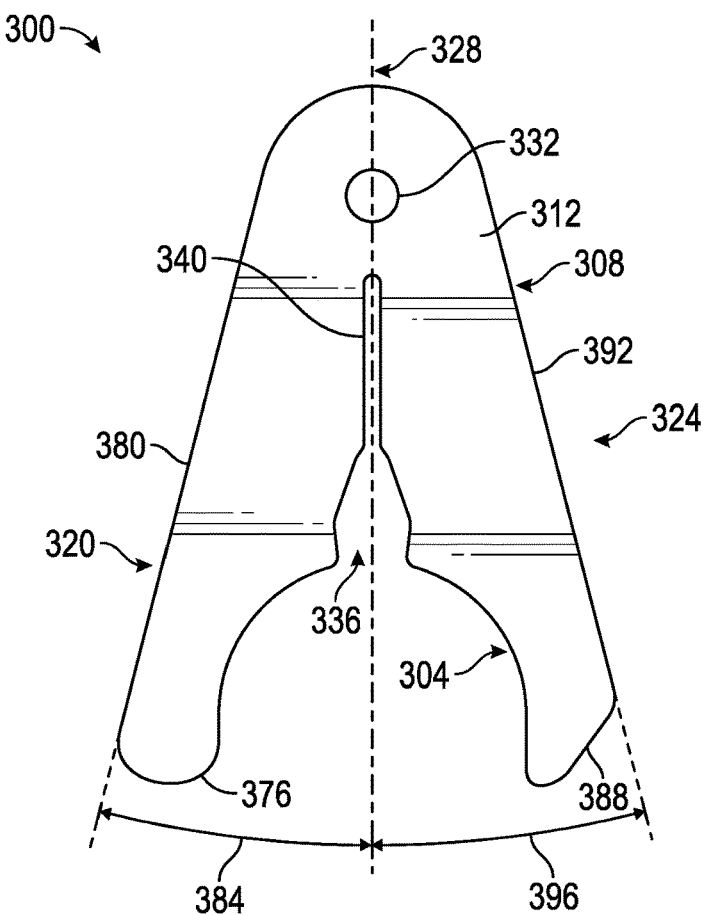
FIG. 21 shows another embodiment of an adjustable clamp.
Figure 22:
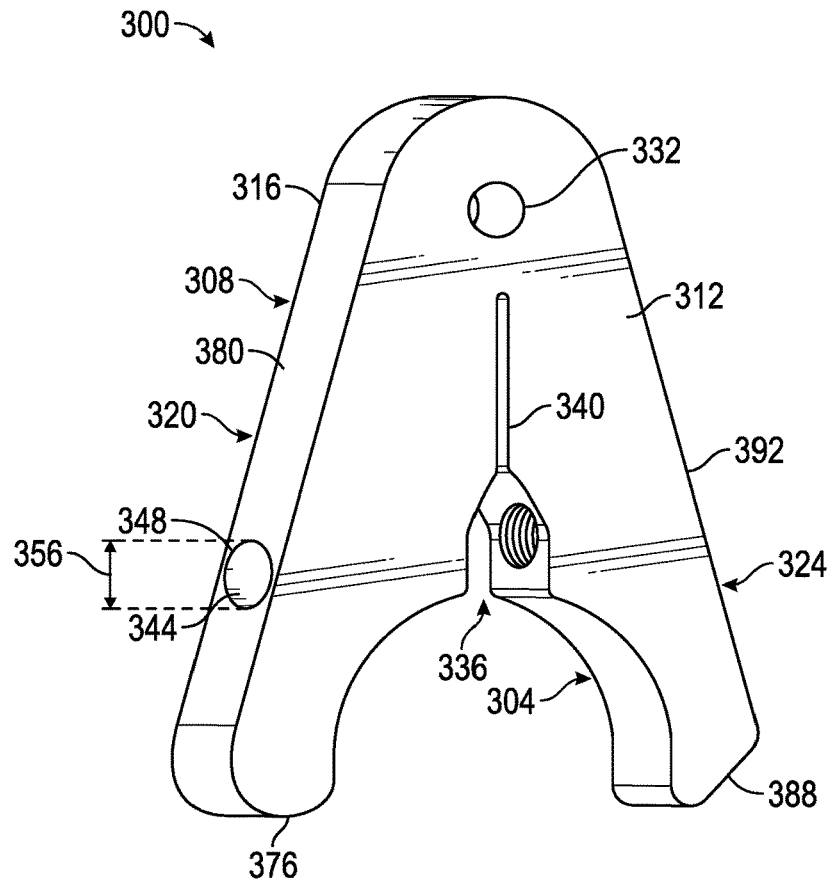
FIG. 22 shows a front perspective view of the adjustable clamp of FIG. 21.
Figure 23:
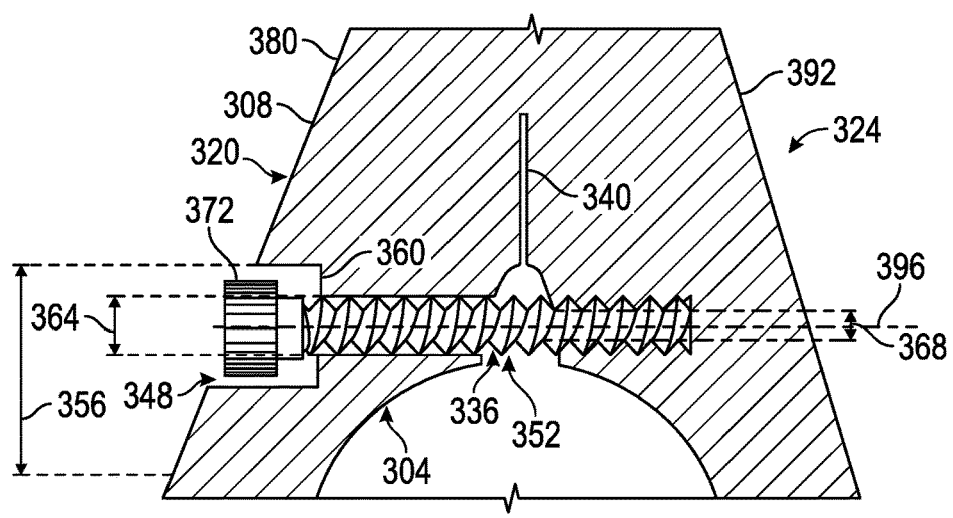
FIG. 23 shows across-sectional view of a fastener coupled into a bore of the adjustable clamp of FIG. 21.

Another embodiment of the invention is directed to an adjustable clamp 300 comprising a general A-frame shape as illustrated in FIGS. 21-23. The adjustable clamp 300 can be attached to a wide range of different sized cylindrical objects by adjusting a fastener, such as a screw. The adjustable clamp 300 can be further attached to any edge or flat surfaces. The adjustable clamp 300 comprises an inner surface 304, an outer surface 308, a front surface 312, a back surface 316, a first half 320 and a second half 324 wherein a centerline axis 328 separates the first half from the second half.

The centerline axis 328 of the adjustable clamp 300 extends through an aperture 332, a recess 336, and a slit 340 of the adjustable clamp 300. The aperture 332 of the adjustable clamp 300 is located on the front surface 312 near the top portion of the adjustable clamp 300 and extends through to the back surface 316, perpendicular to the centerline axis 328. Further, the aperture 332 is symmetrical about the centerline axis 328 and is concentric with a generally circular shape of the outer surface 308 where the first half 320 and the second half 324 integrally form together. The aperture 332 can comprise an inner threaded surface or a smooth inner surface. The aperture 332 can further receive a fastener to attach the adjustable clamp 300 to a flat surface or any edge. The fastener can be a machine screw, a sheet metal screw, a self-drilling screw, a nail, or any other fastening device.

The recess 336 of the adjustable clamp 300 is located below the aperture 332, extending upward from the inner surface 304, and symmetrical about the centerline axis 328. The recess 336 extends from the front surface 312 through to the back surface 316, perpendicular to the centerline axis 328. As illustrated in FIG. 21, the recess 336 comprises a generally rounded pentagonal shape.

The slit 340 extends upward from an apex of the recess 336 toward the aperture 332, symmetrical about the centerline axis 328. The slit 340 further extends from the front surface 312 through to the back surface 316, perpendicular to the centerline axis 328. The slit 340 comprises a width that is constant throughout extending upward toward the aperture 332 and from the front surface 312 through to the back surface 216.

The shape and location of both the recess 336 and slit 340 allows for the first half 320 and the second half 324 to constrict or enlarge the contoured shape of the adjustable clamp 300 by compressing or expanding the recess 336 and slit 340 without deforming the contoured shape of the adjustable clamp 300. Constricting the first half 320 and the second half 324 allows for the adjustable clamp 300 to secure onto the cylindrical object. Loosening the first half 320 and the second half 324 allows for the contoured shape of the adjustable clamp 300 to expand. The expansion of the first half 320 and the second half 324 allows for the adjustable clamp 300 to detach from the cylindrical object.

I. Bore

As illustrated in FIGS. 22 and 23, the adjustable clamp 300 further comprises a bore 344. The bore 344 extends through the outer surface 308 of the first half 320 and into the recess 336. The bore 344 continues through the recess 336 and into the second half 324. In some examples, the bore 344 can extend into a portion of the second half 324 or extend through the second half 324 to the outer surface 308. The bore 344 comprises an axis 396 which parallel with the front surface 312 and the back surface 316 and perpendicular to the centerline axis 328. The bore 344 further comprises a first end 348 and a second end 352. The first end 348 is positioned on the outer surface 308 of the first half 320 and has a first diameter 356. The bore 344 further still comprises a step 360 with a reduction in diameter and extends into the recess 336. The second end 352 has a second diameter 364. The second diameter 364 is smaller than the first diameter 356. As seen in FIG. 23, the bore 344 continues through the recess 336 and into the second half 324 of the adjustable clamp 300. The portion of the bore 344 in the second half 324 comprises a third diameter 368. The third diameter 368 is less than both the first diameter 356 and the second diameter 364 of the bore 368. The portion of the bore 344 in the second half 324 further comprises a threaded inner surface configured to receive a fastener 372.

II. Fastener

As referenced above, the bore 344 is configured to receive the fastener 372 similar to the fastener 130, 254. The fastener 372 can be a machine screw, a sheet metal screw, a hex bolt, a lag bolt, a self-drilling screw a flange bolt, an eye bolt, a carriage bolt, a socket screw or any other fastening device. FIGS. 9 and 23 illustrate an example of the fastener 372. The fastener 372 will either compress or expand the recess 336 and slit 340. As illustrated in FIGS. 9 and 23, the fastener 372 comprises a threaded surface that mates with the threaded inner surface of the bore 344 in the second half 324 of the adjustable clamp 300. When tightening the adjustable clamp 300, the threads of the fastener 372 engage the threaded inner surface of the bore 344 in the second half 324, and compress the recess 336 and slit 340. When loosening the adjustable clamp 300, the threads of the fastener 372 disengage the threaded inner surface of the bore 344, and expand the recess 336 and slit 340.

III. First Half

The first half 320 comprises a rounded edge 376. The rounded edge 376 generally divides the outer surface 308 with the inner surface 304. Further, the rounded edge 376 allows for the adjustable clamp 300 to slide onto or snap onto the cylindrical object without damaging the surface of the cylindrical object.

The first half 320 further comprises a flat edge 380 positioned on the outer surface 308. The flat edge 380 in reference to the centerline axis 328 creates a first angle 380 for the adjustable clamp 300. The first angle 380 of the adjustable clamp 300 can range between at least 10 degrees to at least 45 degrees. In some constructions, the first angle of the adjustable clamp 200 can be at least 10 degrees, at least 15 degrees, at least 20 degrees, at least 25 degrees, at least 30 degrees, at least 35 degrees, at least 40 degrees, or at least 45 degrees.

IV. Second Half

The second half 324 comprises a rounded flat edge 388. The rounded flat edge 388 generally divides the outer surface 308 from the inner surface 304. Further, the rounded flat edge 388 allows for the adjustable clamp 300 to slide onto or snap onto the cylindrical object without damaging the surface of the cylindrical object.

The second half 324 further comprises a flat edge positioned 392 on the outer surface 308. The flat edge 392 of the second half 324 creates a second angle 396 for the adjustable clamp 300 when in reference to the centerline axis 328. The second angle 396 of the adjustable clamp 300 can range between at least 10 degrees to at least 45 degrees. In some embodiments, the second angle 396 of the adjustable clamp 300 can be at least 10 degrees, at least 15 degrees, at least 20 degrees, at least 25 degrees, at least 30 degrees, at least 35 degrees, at least 40 degrees, or at least 45 degrees.

In some constructions, the first angle 384 of the adjustable clamp 300 is the same angle as the second angle 396 of the adjustable clamp 300. In alternate constructions, the first angle 384 of the adjustable clamp 300 can be greater than the second angle 396 of the adjustable clamp 300. Still in alternate constructions, the first angle 384 of the adjustable clamp 300 can be less than the second angle 396 of the adjustable clamp 300.

The adjustable clamp 10, 150, 300 comprise of a material. The material the adjustable clamp 10, 150, 300 can be steel, tungsten, aluminum, titanium, vanadium, chromium, cobalt, nickel, other metals, metal alloys, or any combination thereof. Alternatively the adjustable clamp 10, 150, 300 head may comprise a composite or other polymer materials. The fastener 130, 254, 372 comprise a material. The material of the fastener 130, 254, 372 can be carbon steel, tungsten, aluminum, titanium, vanadium, chromium, cobalt, nickel, other metals, metal alloys, or any combination thereof. In some embodiments, the material of the fastener 130, 254, 372 can be a different material than the material of the adjustable clamp 10, 150, 300. In other embodiments, the material of the fastener 130, 254, 372 and the material of the adjustable clamp 10, 150, 300 are of the same material.

Clause 1. A clamp comprising:
 a curved body having an inner surface and an outer surface, the curved body configured to fit onto a cylindrical object;
 a first side section integral with the curved body;
 a first flange integral with and extending from the first side section;
 a first protrusion formed in the inner surface at an intersection formed by the first side section and the first flange;
 a second side section integral with the curved body, the second side section positioned opposite the first side section;
 a recess formed in the curved body, that divides the curved body into a first portion and a second portion, and comprises an arcuate surface defining a radius of curvature and an axis;
 and
 a bore having a first end and second end, wherein;
  the first end of the bore extending through the outer surface of the first portion of the curved body and through the recess to the second portion of the curved body;
  the bore defines an axis oriented parallel with the first flange and perpendicular to the axis of the recess; and
  the bore configured to receive a fastener to adjust a position of the clamp on the cylindrical object.

Clause 2. The clamp of clause 1, further comprising a second flange integral with and extending from the second side section, the second flange oriented parallel with the first flange.

Clause 3. The clamp of clause 2, further comprising a second protrusion formed in the inner surface at an intersection formed by the second side section and the second flange.

Clause 4. The clamp of clause 3, further comprising a notch formed in the inner surface at an intersection formed by the second side section and the second flange, the notch positioned adjacent to the second protrusion.

Clause 5. The clamp of clause 4, wherein the notch is closest to the second flange and the second protrusion is closest to the recess.

Clause 6. The clamp of clause 2, wherein the second flange comprises a thickness in a range between approximately 3 mm to 15 mm and an aperture for receiving a fastener.

Clause 7. The clamp of clause 1, wherein the first flange comprises a thickness in a range between approximately 1 mm to 10 mm and an aperture for receiving a fastener.

Clause 8. The clamp of clause 1, wherein the bore formed in the second portion of the curved body comprises a threaded inner surface configured to receive the fastener.

Clause 9. The clamp of clause 1, wherein the recess compresses when the fastener is tightened within the bore, and wherein the recess expands when the fastener is loosened within the bore.

Clause 10. A method of securing a clamp onto a cylindrical object, the method comprising:
 snapping the clamp onto a cylindrical object whereby the clamp flexes to fit onto the cylindrical object;
 moving the clamp to a desired position on the cylindrical object;
 inserting a fastener into a bore on the clamp; and
 rotating the fastener to compress a recess in the clamp and secure the clamp to the cylindrical object.

Clause 11. The method of clause 10, wherein the clamp comprises a flange that can receive objects to hang therefrom.

Clause 12. The method of clause 11, wherein the flange comprises an aperture, the method further including inserting the fastener into the aperture to secure the clamp to a support surface.

Clause 13. The method of clause 10 further comprising attaching a device to the clamp.

Clause 14. A method of manufacturing a clamp, the method comprising:
  manufacturing a clamp comprising;
    a curved body having an inner surface and an outer surface, the curved body configured to fit onto a cylindrical object;
    a first side section integral with the curved body;
    a first flange integral with and extending from the first side section;
    a first protrusion formed in the inner surface at an intersection formed by the first side section and the first flange;
    a second side section integral with the curved body, the second side section positioned opposite the first side section;
    a recess formed in the curved body, that divides the curved body into a first portion and a second portion, and comprises an arcuate surface defining a radius of curvature and an axis;
    and
    a bore having a first end and second end, wherein;
      the first end of the bore extending through the outer surface of the first portion of the curved body and through the recess to the second portion of the curved body;
      the bore defines an axis oriented parallel with the first flange and perpendicular to the axis of the recess; and
      the bore configured to receive a fastener to adjust a position of the clamp on the cylindrical object.

Clause 15. The method of clause 14, wherein:
  the clamp to be comprised of aluminum or other metals or any combination thereof; and
  the fastener to be comprised of carbon steel or other metals or any combination thereof.

Clause 16. The method of clause 14, wherein:
  the recess is milled with a rotary cutting tool having a radius;
  the inner diameter of the clamp is milled with a rotary cutting tool having a radius;
  the first end of the bore is milled with a rotary cutting tool having a radius;
  the second end of the bore is milled with a rotary cutting tool having a radius, wherein
  the radius of the rotary cutting tool for the second end of the bore is smaller than the radius of the rotary cutting tool for the first end of the bore;
  the portion of the bore in the second portion is milled with a rotary cutting tool having a radius, wherein
  the radius of the rotary cutting tool for the portion of the bore in the second portion is smaller than the radius of the rotary cutting tool for the second end of the bore; and
  the aperture of the flange is milled with a rotary cutting tool having a radius.

Clause 17. The method of clause 14, wherein:
  the portion of the bore in the second portion is milled further with a tapping tool with a radius to create the threaded inner surface; and
  the tapping tool has a threading that matches the threaded outer surface of the fastener.

Clause 18. The method of clause 14, wherein:
  the clamp further comprising a second protrusion formed in the inner surface at an intersection formed by the second side section and the second flange, wherein
  the protrusion is rounded with an edge machine.

Clause 19. A clamp configured to fit onto a cylindrical object comprising:
  an inner and an outer surface,
  a front surface and a back surface,
  a first half and a second half separated by a centerline axis;
    the centerline axis that extends through an aperture, a recess, and a slit, wherein;
    the aperture is symmetrical about the centerline axis and is to receive a fastener;
    the recess extends upward from the inner surface, extends perpendicular to the centerline axis from the front surface through to the back surface, and is symmetrical about the centerline axis;
    the slit extends upward from an apex of the recess, extends perpendicular to the centerline axis from the front surface through to the back surface, and is symmetrical about the centerline axis;
    and
    a bore having a first end and second end, wherein;
      the first end of the bore extending through the outer surface of the first half of the clamp and through the recess into the second half of the clamp;
      the bore defines an axis oriented parallel with the front surface and the back surface, and is perpendicular to the centerline axis; and
      the bore configured to receive a fastener to adjust a position of the clamp on the cylindrical object.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages of the disclosure are set forth in the following claims.

What is claimed is:

1. A clamp comprising:
  a curved body having an inner surface and an outer surface, the curved body configured to fit onto a cylindrical object;
  a first side section integral with the curved body;
  a first flange integral with and extending from the first side section;
    wherein the first flange comprises a first flange aperture;

a first protrusion formed in the inner surface at an intersection formed by the first side section and the first flange;

a second side section integral with the curved body, the second side section positioned opposite the first side section;

a recess formed in the curved body, that divides the curved body into a first portion and a second portion, and comprises an arcuate surface defining a radius of curvature and an axis; and a bore having a first end and second end, wherein;

the first end of the bore extending through the outer surface of the first portion of the curved body and through the recess to the second portion of the curved body;

the bore defines a bore axis oriented parallel with the first flange and perpendicular to the axis of the recess; and the bore configured to receive a fastener to adjust a position of the clamp on the cylindrical object;

wherein the clamp consists of a metallic alloy.

2. The clamp of claim 1, further comprising a second flange integral with and extending from the second side section, the second flange oriented parallel with the bore axis;

wherein the second flange comprises a second flange aperture.

3. The clamp of claim 2, further comprising a second protrusion formed in the inner surface at an intersection formed by the second side section and the second flange.

4. The clamp of claim 3, further comprising a notch formed in the inner surface at an intersection formed by the second side section and the second flange, the notch positioned adjacent to the second protrusion.

5. The clamp of claim 4, wherein the notch is closest to the second flange and the second protrusion is closest to the recess.

6. The clamp of claim 2, wherein the second flange comprises a thickness in a range between approximately 3 mm to 15 mm and an aperture for receiving a fastener.

7. The clamp of claim 1, wherein the first flange comprises a thickness in a range between approximately 1 mm to 10 mm and an aperture for receiving a fastener.

8. The clamp of claim 1, wherein the recess compresses when the fastener is tightened within the bore, and wherein the recess expands when the fastener is loosened within the bore.

* * * * *